(12) United States Patent
Takahashi

(10) Patent No.: US 7,433,064 B2
(45) Date of Patent: Oct. 7, 2008

(54) PRINTING APPARATUS, PRINTING METHOD, IMAGE PROCESSING APPARATUS, IMAGE PROCESSING METHOD, PRINTING PROGRAM, IMAGE PROCESSING PROGRAM, AND STORAGE MEDIUM

(75) Inventor: Toru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 25 days.

(21) Appl. No.: 11/554,195

(22) Filed: Oct. 30, 2006

(65) Prior Publication Data

US 2007/0097405 A1    May 3, 2007

(30) Foreign Application Priority Data

Oct. 31, 2005   (JP)   ............................. 2005-315763
Jul. 28, 2006   (JP)   ............................. 2006-206475

(51) Int. Cl.
  *G06F 3/12*  (2006.01)
  *G06K 9/03*  (2006.01)

(52) U.S. Cl. ...................... 358/1.13; 358/1.9; 358/518; 382/167; 382/252; 382/309

(58) Field of Classification Search ............... 358/1.13, 358/1.9, 518; 382/252, 309, 167
See application file for complete search history.

(56) References Cited

U.S. PATENT DOCUMENTS

| 5,828,780 | A | * | 10/1998 | Suzuki et al. ............... 382/167 |
| 5,850,472 | A | * | 12/1998 | Alston et al. ................ 382/162 |
| 5,861,911 | A | * | 1/1999 | Oosaka et al. ................ 348/96 |
| 6,046,820 | A | * | 4/2000 | Konishi ...................... 358/1.9 |
| 6,313,857 | B1 | * | 11/2001 | Shimizu ...................... 347/188 |
| 6,443,550 | B1 | * | 9/2002 | Komiya et al. ................ 347/19 |
| 6,707,579 | B1 | * | 3/2004 | Komiya et al. ............... 358/3.1 |
| 6,757,427 | B1 | * | 6/2004 | Hongu ....................... 382/164 |

(Continued)

FOREIGN PATENT DOCUMENTS

JP          05-092559          4/1993

*Primary Examiner*—Mark Zimmerman
*Assistant Examiner*—Huo Long Chen
(74) *Attorney, Agent, or Firm*—Harness, Dickey & Pierce, P.L.C.

(57) ABSTRACT

A printing apparatus includes: a unit that generates test pattern data considering visual characteristics, on the basis of a test pattern grayscale value determined on the basis of visual sensitivity; an N-value conversion unit that converts the test pattern data generated by the unit that generates test pattern data considering visual characteristics into an N value ($N \geq 2$: N is a natural number); a printing data generating unit that generates test pattern printing data on the basis of the N-value test pattern data output from the N-value conversion unit; a printing unit that performs printing on the basis of the test pattern printing data generated by the printing data generating unit; an output density detecting unit that detects the output density of a test pattern printed by the printing unit; a printer input/output density information generating unit that generates printer input/output density information for correcting input density, on the basis of the output density of the test pattern detected by the output density detecting unit; an image data acquiring unit that acquires image data composed of M values ($M > N \geq 2$: M is a natural number); and an input density correcting unit that corrects the input density of the image data acquired by the image data acquiring unit, on the basis of the printer input/output density information generated by the printer input/output density information generating unit.

8 Claims, 10 Drawing Sheets

U.S. PATENT DOCUMENTS

| | | |
|---|---|---|
| 6,843,610 B2 * | 1/2005 | Ioka et al. .................... 400/76 |
| 6,873,813 B2 * | 3/2005 | Furukawa et al. ........... 399/222 |
| 6,876,467 B1 * | 4/2005 | Yamaguchi ................. 358/1.9 |
| 7,292,370 B2 * | 11/2007 | Iwaki ......................... 358/1.9 |
| 7,319,545 B2 * | 1/2008 | Linder et al. ................ 358/1.9 |
| 2001/0015835 A1 * | 8/2001 | Aoki .......................... 358/525 |
| 2003/0117414 A1 * | 6/2003 | Sasaki ........................ 345/589 |
| 2005/0179946 A1 * | 8/2005 | Takamatsu et al. ......... 358/1.18 |
| 2005/0259286 A1 * | 11/2005 | Iwaki ......................... 358/1.9 |
| 2006/0181719 A1 * | 8/2006 | Aoki et al. .................. 358/1.9 |
| 2006/0247877 A1 * | 11/2006 | Bala et al. ................... 702/107 |
| 2007/0140333 A1 * | 6/2007 | Chono et al. ........... 375/240.03 |
| 2007/0279695 A1 * | 12/2007 | Kouzaki et al. ............ 358/3.06 |

* cited by examiner

| NUMBER | L* VALUE | RGB-G VALUE |
|---|---|---|
| 0 | 0.0 | 0 |
| 1 | 14.3 | 5 |
| 2 | 28.6 | 14 |
| 3 | 42.9 | 33 |
| 4 | 57.1 | 64 |
| 5 | 71.4 | 109 |
| 6 | 85.7 | 172 |
| 7 | 100.0 | 255 |

FIG. 7

| NUMBER | L* VALUE | RGB-G VALUE |
|---|---|---|
| 0 | 0.0 | 0 |
| 1 | 6.7 | 3 |
| 2 | 13.3 | 4 |
| 3 | 20.0 | 8 |
| 4 | 26.7 | 13 |
| 5 | 33.3 | 20 |
| 6 | 40.0 | 29 |
| 7 | 46.7 | 40 |
| 8 | 53.3 | 54 |
| 9 | 60.0 | 72 |
| 10 | 66.7 | 92 |
| 11 | 73.3 | 117 |
| 12 | 80.0 | 145 |
| 13 | 86.7 | 177 |
| 14 | 93.3 | 214 |
| 15 | 100.0 | 255 |

FIG. 8

| NUMBER | OUTPUT RGB-G VALUE | INPUT RGB-G VALUE |
|---|---|---|
| 0 | 0 | 0 |
| 1 | 5 | 32 |
| 2 | 14 | 82 |
| 3 | 33 | 127 |
| 4 | 64 | 168 |
| 5 | 109 | 207 |
| 6 | 172 | 237 |
| 7 | 255 | 255 |

| NUMBER | OUTPUT RGB-G VALUE | INPUT RGB-G VALUE |
|---|---|---|
| 0 | 0 | 0 |
| 1 | 3 | 15 |
| 2 | 4 | 24 |
| 3 | 8 | 51 |
| 4 | 13 | 78 |
| 5 | 20 | 101 |
| 6 | 29 | 122 |
| 7 | 40 | 138 |
| 8 | 54 | 156 |
| 9 | 72 | 176 |
| 10 | 92 | 194 |
| 11 | 117 | 212 |
| 12 | 145 | 227 |
| 13 | 177 | 239 |
| 14 | 214 | 249 |
| 15 | 255 | 255 |

PRINTING APPARATUS, PRINTING METHOD, IMAGE PROCESSING APPARATUS, IMAGE PROCESSING METHOD, PRINTING PROGRAM, IMAGE PROCESSING PROGRAM, AND STORAGE MEDIUM

BACKGROUND

1. Technical Field

The present invention relates to a printing apparatus for correcting input density to perform printing, a printing method, an image processing apparatus, an image processing method, a printing program, an image processing program, and a storage medium.

2. Related Art

An ink-jet printer that discharges ink droplets on a sheet, serving as a medium, to form dots has been known as a printing apparatus for printing images. The ink-jet printer repeatedly performs a dot forming operation for discharging ink droplets from a plurality of nozzles that move in a predetermined moving direction to form dots on a sheet and a sheet transfer operation for transferring the sheet in a direction intersecting the moving direction of the sheet (hereinafter, referred to as a transfer direction) by using a transfer unit. In this way, a plurality of raster lines each composed of a plurality of dots formed along the moving direction are formed in the transfer direction, thereby printing an image.

However, in this type of printer, irregularity in the density of an image composed of a plurality of raster lines in parallel to the moving direction occurs. That is, dark raster lines and light raster lines may macroscopically appear.

The irregularity in the density is generally caused by the processing accuracy of nozzles, and the following method is used to control the irregularity in the density. First, a printer that controls the density irregularity prints a correcting pattern (test pattern), and a density measuring apparatus measures the density of the pattern to calculate the correction value of each nozzle so as to obtain a target density. Then, the correction value of each nozzle is stored in a storage unit of the printer. When a user prints an image, the printer uses the correction value corresponding to each nozzle to correct the discharge amount of ink, thereby controlling the density irregularity. For example, JP-A-5-92559 discloses a printing apparatus for correcting the input density of each raster line to perform printing.

In the printing apparatus, read image data that is read by a document reading device and corresponds to each recording element of a recording head is obtained by weighting each image data to image data of another recording element in a smoothing circuit. Therefore, a CPU calculates the correction value of each recording element on the basis of the image data, the calculated values are stored in an irregularity correcting data backup RAM, and a correcting circuit uses the correction values to correct the image data. A binarizing circuit is a recording device for generating recording head driving data by weighting correcting image data of other recording elements on the basis of the corrected image data of each recording element. In this way, when a recording head including a plurality of recording elements is used to print an image, it is possible to rapidly and exactly correct the irregularity in the density caused by the recording elements.

However, according to the printing apparatus disclosed in JP-A-5-92559, it is possible to reduce the irregularity in the density, but it is difficult to reduce the banding of grayscale levels which are visually noticeable to the human eye. That is, it does not matter if the correction accuracy is low in a highlighted region that is not visually noticeable to the human eye. Therefore, it is possible to reduce the number of grayscale levels of a test pattern, but it is difficult to improve the accuracy of density correction in a grayscale region (shadow region) that is visually noticeable to the human eye.

SUMMARY

An advantage of some aspects of the invention is that it provides a printing apparatus, a printing method, an image processing apparatus, an image processing method, a printing program, and an image processing program capable of reducing density irregularity and reducing the banding of a grayscale region that is visually noticeable to the human eye, and another advantage of some aspects of the invention is that it provides a storage medium having the printing program or the image processing program stored therein.

First Aspect

According to a first aspect of the invention, a printing apparatus includes: a unit that generates test pattern data considering visual characteristics, on the basis of a test pattern grayscale value determined on the basis of visual sensitivity; an N-value conversion unit that converts the test pattern data generated by the unit that generates test pattern data considering visual characteristics into an N value ($N \geq 2$: N is a natural number); a printing data generating unit that generates test pattern printing data on the basis of the N-value test pattern data output from the N-value conversion unit; a printing unit that performs printing on the basis of the test pattern printing data generated by the printing data generating unit; an output density detecting unit that detects the output density of a test pattern printed by the printing unit; a printer input/output density information generating unit that generates printer input/output density information for correcting input density, on the basis of the output density of the test pattern detected by the output density detecting unit; an image data acquiring unit that acquires image data composed of M values ($M > N \geq 2$: M is a natural number); and an input density correcting unit that corrects the input density of the image data acquired by the image data acquiring unit, on the basis of the printer input/output density information generated by the printer input/output density information generating unit.

According to the above-mentioned structure, a plurality of test pattern grayscale values of a grayscale region (shadow region) that is visually noticeable to the human eye are determined beforehand, and the unit for generating a test pattern considering visual characteristics generates test pattern data of these test pattern grayscale values, which makes it possible to improve the accuracy of density correction of the region that is visually noticeable to the human eye. It does not matter if the correction accuracy is low in a grayscale region that is not visually noticeable to the human eye (highlighted region), which makes it possible to reduce the number of grayscale levels for generating the test pattern data.

Here, the term 'visual sensitivity' is calculated by the Weber-Fechner's law stating that 'human sensation is proportional to the logarithm of stimulus intensity'. According to the Weber-Fechner's law, when S indicates the level of sensation (sensibility), I indicates the amount of physical stimulus, and k is a constant, the following expression is obtained: $S = k \cdot \log I$. The expression is not limited to visual sensation, but can be applied to, for example, the sense of hearing and the sense of smell. In this aspect, for example, 'brightness' indicating the degree of luminosity is used as the amount of physical stimulus I, which is similarly applied to the following aspects related to an 'image processing apparatus', a 'printing method', an 'image processing method', a 'printing program', an 'image processing program', and a 'computer readable storage medium'.

The 'test pattern grayscale value' means the grayscale value of the test pattern data used to print a test pattern, which is similarly applied to the following aspects related to an 'image processing apparatus', a 'printing method', 'an image processing method', a 'printing program', an 'image processing program', and a 'computer readable storage medium'.

Second Aspect

According to a second aspect of the invention, the printing apparatus according to the first aspect further includes a test pattern grayscale value selecting unit that selects the test pattern grayscale value from a predetermined range of grayscale values on the basis of the visual sensitivity. In the printing apparatus, the unit that generates test pattern data considering visual characteristics generates the test pattern data on the basis of the test pattern grayscale value selected by the test pattern grayscale value selecting unit.

According to this structure, the test pattern grayscale value selecting unit selects a plurality of test pattern grayscale values of a grayscale region (shadow region) that is visually noticeable to the human eye, and the unit that generates a test pattern considering visual characteristics generates test pattern data of the test pattern grayscale values. In this way, it is possible to improve the correction accuracy of the density of the region visually noticeable to the human eye. It does not matter if the correction accuracy is low in a grayscale region that is not visually noticeable to the human eye (highlighted region), and thus it is possible to reduce the number of grayscale values for generating the test pattern data.

Third Aspect

According to a third aspect of the invention, in the printing apparatus according to the second aspect, preferably, the test pattern grayscale value selecting unit selects the test pattern grayscale values such that the number of test pattern grayscale values selected from a grayscale region in which the visual sensitivity is higher than a predetermined threshold value is larger than the number of test pattern grayscale values selected from a grayscale region in which the visual sensitivity is lower than the predetermined threshold value.

According to this structure, the test pattern grayscale value selecting unit selects the test pattern grayscale values such that the number of test pattern grayscale values selected from a grayscale region that is visually noticeable to the human eye (shadow region) is larger than the number of test pattern grayscale values selected from a grayscale region that is not visually noticeable to the human eye (highlighted region). Therefore, for example, the predetermined threshold value is set to the minimum value of the grayscale value that is visually noticeable to the human eye, which causes the number of test pattern data (fine test pattern) of the grayscale region that is visually noticeable to the human eye to be larger than that of the other grayscale regions. As a result, it is possible to reduce the banding of the grayscale region visually noticeable to the human eye. In addition, the input density correcting unit can improve the correction accuracy of the density of the grayscale region visually noticeable to the human eye, which makes it possible to reduce the banding.

For example, FIG. 13 shows a graph in which the visual sensitivity is represented by an L* value of an L*a*b* color system, the horizontal axis indicates a G value among RGB values (256 grayscale levels), and the vertical axis indicates the L* value corresponding to the G value. When visual sensitivity is represented by the L* value, the smaller the L* value becomes, the higher the sensitivity (stimulus) becomes.

In the graph, for example, when the predetermined threshold value of the L* value is 50, a region having the L* value smaller than 50 has the G value smaller than 48, and thus corresponds to a dark region among the grayscale regions represented by 256 grayscale levels. On the other hand, a region having the L* value equal to or larger than 50 has the G value equal to or larger than about 48, and thus is a region that is brighter than the region having the G value smaller than 48 (a region having lower visual sensitivity than the region having the L* value smaller than 50) among the grayscale regions represented by 256 grayscale levels. In this case, for the grayscale region having the L* value smaller than 50 (for example, a region having the G value in the range of 0 to 47), for example, 10 (selection number L1) grayscale values corresponding to 10 equal parts of the visual sensitivity having an equal interval of 5 are selected such that a lot of test pattern data are generated. For the grayscale region having the L* value equal to or larger than 50 (for example, a region having the G value in the range of 48 to 255), for example, 5 (selection number L2) grayscale values corresponding to five equal parts of the visual sensitivity having an equal interval of 10 are selected such that a smaller number of test pattern data is generated as compared with when the threshold value of the L* value is smaller than 50. This is similarly applied to the following aspects related to an 'image processing apparatus', a 'printing method', an 'image processing method', a 'printing program', an 'image processing program', and a 'computer readable storage medium'.

Fourth Aspect

According to a fourth aspect of the invention, in the printing apparatus according to the third aspect, preferably, the test pattern grayscale value selecting unit selects the test pattern grayscale values such that the number of parts divided from a grayscale region in which the visual sensitivity is higher than a predetermined threshold value is larger than the number of parts divided from a grayscale region in which the visual sensitivity is lower than the predetermined threshold value.

According to this structure, the test pattern grayscale value selecting unit selects the test pattern grayscale values such that the number of parts divided from a grayscale region in which the visual sensitivity is higher than a predetermined threshold value is larger than the number of parts divided from a grayscale region in which the visual sensitivity is equal to or lower than the predetermined threshold value. Therefore, it is possible to generate test pattern data of grayscale values obtained by dividing the grayscale region that is visually noticeable to the human eye into a larger number of parts than that of the grayscale region that is not visually noticeable to the human eye, which makes it possible to effectively reduce density irregularity.

For example, in the graph shown in FIG. 13, when the threshold value of the visual sensitivity (L* value) is set to 50, for a grayscale region having the L* value smaller than the threshold value of 50 (for example, a region having the G value in the range of 0 to 47), as represented by dotted lines of FIG. 13 in part, the visual sensitivity is divided into 25 parts having a divided step width of 2, and 25 grayscale values corresponding to the divided steps (the number of divided steps D1=25) are selected. For a grayscale region having the L* value equal to or larger than the threshold value of 50 (for example, a region having the G value in the range of 48 to 255), as represented by dotted lines in FIG. 13 in part, the visual sensitivity is divided into 10 parts having a divided step width of 5, and 10 grayscale values corresponding to the divided steps (the number of divided steps D2=10) are selected such that the number of divided steps is smaller than that when the L* value is smaller than the threshold value of 50. This is similarly applied to the following aspects related to an 'image processing apparatus', a 'printing method', 'an image processing method', a 'printing program', an 'image processing program', and a 'computer readable storage medium'.

Fifth Aspect

According to a fifth aspect of the invention, in the printing apparatus according to the third aspect, preferably, the test pattern grayscale value selecting unit selects the test pattern grayscale values such that the number of parts divided from a grayscale region in which the visual sensitivity is lower than a predetermined threshold value is smaller than the number of parts divided from a grayscale region in which the visual sensitivity is higher than the predetermined threshold value.

According to this structure, the test pattern grayscale value selecting unit selects the test pattern grayscale values such that the number of parts divided from a grayscale region in which the visual sensitivity is lower than a predetermined threshold value is smaller than the number of parts divided from a grayscale region in which the visual sensitivity is higher than the predetermined threshold value. Therefore, it is possible to generate test pattern data of grayscale values obtained by dividing the grayscale region that is visually noticeable to the human eye into a larger number of parts than that of the grayscale region that is not visually noticeable to the human eye, which makes it possible to effectively reduce density irregularity.

For example, in the graph shown in FIG. 13, when the threshold value of the visual sensitivity (L* value) is set to 50, for a grayscale region having the L* value smaller than the threshold value of 50 (for example, a region having the G value in the range of 0 to 47), as represented by dotted lines of FIG. 13 in part, the visual sensitivity is divided into 25 parts having a divided step width of 2, and 25 grayscale values corresponding to the divided steps (the number of divided steps D1=25) are selected. For a grayscale region having the L* value equal to or larger than the threshold value of 50 (for example, a region having the G value in the range of 48 to 255), as represented by dotted lines in FIG. 13 in part, the visual sensitivity is divided into 10 parts having a divided step width of 5, and 10 grayscale values corresponding to the divided steps (the number of divided steps D2=10) are selected such that the number of divided steps is smaller than when the L* value is smaller than the threshold value of 50. This is similarly applied to the following aspects related to an 'image processing apparatus', a 'printing method', an 'image processing method', a 'printing program', an 'image processing program', and a 'computer readable storage medium'.

Sixth Aspect

According to a sixth aspect of the invention, in the printing apparatus according to the second aspect, preferably, the test pattern grayscale value selecting unit selects the test pattern grayscale values at equal intervals or at substantially equal intervals with respect to the visual sensitivity.

According to this structure, since the test pattern grayscale value selecting unit selects the test pattern grayscale values at equal intervals or at substantially equal intervals with respect to the visual sensitivity, it is possible to generate good test pattern data closer to visual characteristics of a human being.

The term 'substantially equal interval' includes widths calculated by raising decimals to the next whole number or omitting decimals when a predetermined visual sensitivity region is not divided by a predetermined division number at equal intervals without a remainder. This is similarly applied to the following aspects related to an 'image processing apparatus', a 'printing method', an 'image processing method', a 'printing program', an 'image processing program', and a 'computer readable storage medium'.

Seventh Aspect

According to a seventh aspect of the invention, in the printing apparatus according to any one of the first to sixth aspects, preferably, the visual sensitivity is an L* value of a CIE 1976 L*a*b* color space.

According to this structure, since the L* value, a brightness value, of an L*a*b* color system is used, it is possible to generate test pattern data on the basis of a standard closer to the amount of sensibility of a human being that is proportional to the logarithm of physical stimulus.

Eighth Aspect

According to an eighth aspect of the invention, a printing method includes: generating test pattern data considering visual characteristics, on the basis of a test pattern grayscale value determined on the basis of visual sensitivity; converting the test pattern data generated considering the visual characteristics into an N value (N≧2: N is a natural number); generating test pattern printing data on the basis of the N-value test pattern data obtained in the converting of the test pattern data; performing printing on the basis of the test pattern printing data generated in the generating of the printing data; detecting the output density of a test pattern printed in the performing of printing; generating printer input/output density information for correcting input density, on the basis of the output density of the test pattern detected in the detecting of the output density; acquiring image data composed of M values (M>N≧2: M is a natural number); and correcting the input density of the image data acquired in the acquiring of the image data, on the basis of the printer input/output density information generated in the generating of the printer input/output density information.

According to the above-mentioned aspect, it is possible to obtain the same effects as those of the first aspect.

Ninth Aspect

According to a ninth aspect of the invention, preferably, the printing method according to the eighth aspect further includes selecting the test pattern grayscale value from a predetermined range of grayscale values on the basis of the visual sensitivity, and, in the generating of the test pattern data considering visual characteristics, the test pattern data is generated on the basis of the test pattern grayscale value selected in the selecting of the test pattern grayscale value.

According to the above-mentioned aspect, it is possible to obtain the same effects as those of the second aspect.

Tenth Aspect

According to a tenth aspect of the invention, in the printing method according to the ninth aspect, preferably, in the selecting of the test pattern grayscale value, the test pattern grayscale values are selected such that the number of test pattern grayscale values selected from a grayscale region in which the visual sensitivity is higher than a predetermined threshold value is larger than the number of test pattern grayscale values selected from a grayscale region in which the visual sensitivity is lower than the predetermined threshold value.

According to the above-mentioned aspect, it is possible to obtain the same effects as those of the third aspect.

Eleventh Aspect

According to an eleventh aspect of the invention, in the printing method according to the tenth aspect, preferably, in the selecting of the test pattern grayscale value, the test pattern grayscale values are selected such that the number of parts divided from a grayscale region in which the visual sensitivity is higher than a predetermined threshold value is larger than the number of parts divided from a grayscale region in which the visual sensitivity is lower than the predetermined threshold value.

According to the above-mentioned aspect, it is possible to obtain the same effects as those of the fourth aspect.

Twelfth Aspect

According to a twelfth aspect of the invention, in the printing method according to the tenth aspect, preferably, in the selecting of the test pattern grayscale value, the test pattern grayscale values are selected such that the number of parts divided from a grayscale region in which the visual sensitivity is lower than a predetermined threshold value is smaller than the number of parts divided from a grayscale region in which the visual sensitivity is higher than the predetermined threshold value.

According to the above-mentioned aspect, it is possible to obtain the same effects as those of the fifth aspect.

Thirteenth Aspect

According to a thirteenth aspect of the invention, in the printing method according to the ninth aspect, preferably, the selecting of the test pattern grayscale value selects the test pattern grayscale values at equal intervals or at substantially equal intervals with respect to the visual sensitivity.

According to the above-mentioned aspect, it is possible to obtain the same effects as those of the sixth aspect.

Fourteenth Aspect

According to a fourteenth aspect of the invention, in the printing method according to any one of the eighth to thirteenth aspects, preferably, the visual sensitivity is an L* value of a CIE 1976 L*a*b* color space.

According to the above-mentioned aspect, it is possible to obtain the same effects as those of the seventh aspect.

Fifteenth Aspect

According to a fifteenth aspect of the invention, an image processing apparatus includes: a unit that generates test pattern data considering visual characteristics, on the basis of a test pattern grayscale value determined on the basis of visual sensitivity; an N-value conversion unit that converts the test pattern data generated by the unit that generates test pattern data considering visual characteristics into an N value (N≧2: N is a natural number); a printing data generating unit that generates test pattern printing data on the basis of the N-value test pattern data output from the N-value conversion unit; an output density detecting unit that, after printing is performed by a predetermined printing apparatus on the basis of the test pattern printing data generated by the printing data generating unit, detects the output density of a test pattern printed by the predetermined printing apparatus; a printer input/output density information generating unit that generates printer input/output density information for correcting input density, on the basis of the output density of the test pattern detected by the output density detecting unit; an image data acquiring unit that acquires image data composed of M values (M>N≧2: M is a natural number); and an input density correcting unit that corrects the input density of the image data acquired by the image data acquiring unit, on the basis of the printer input/output density information generated by the printer input/output density information generating unit.

According to the above-mentioned aspect, it is possible to obtain the same effects as those of the first aspect.

Sixteenth Aspect

According to a sixteenth aspect of the invention, preferably, the image processing apparatus according to the fifteenth aspect further includes a test pattern grayscale value selecting unit that selects the test pattern grayscale value from a predetermined range of grayscale values on the basis of the visual sensitivity, and the unit that generates test pattern data considering visual characteristics generates the test pattern data on the basis of the test pattern grayscale value selected by the test pattern grayscale value selecting unit.

According to the above-mentioned aspect, it is possible to obtain the same effects as those of the second aspect.

Seventeenth Aspect

According to a seventeenth aspect of the invention, in the image processing apparatus according to the sixteenth aspect, preferably, the test pattern grayscale value selecting unit selects the test pattern grayscale values such that the number of test pattern grayscale values selected from a grayscale region in which the visual sensitivity is higher than a predetermined threshold value is larger than the number of test pattern grayscale values selected from a grayscale region in which the visual sensitivity is lower than the predetermined threshold value.

According to the above-mentioned aspect, it is possible to obtain the same effects as those of the third aspect.

Eighteenth Aspect

According to an eighteenth aspect of the invention, in the image processing apparatus according to the seventeenth aspect, preferably, the test pattern grayscale value selecting unit selects the test pattern grayscale values such that the number of parts divided from a grayscale region in which the visual sensitivity is higher than a predetermined threshold value is larger than the number of parts divided from a grayscale region in which the visual sensitivity is lower than the predetermined threshold value.

According to the above-mentioned aspect, it is possible to obtain the same effects as those of the fourth aspect.

Nineteenth Aspect

According to a nineteenth aspect of the invention, in the image processing apparatus according to the seventeenth aspect, preferably, the test pattern grayscale value selecting unit selects the test pattern grayscale values such that the number of parts divided from a grayscale region in which the visual sensitivity is lower than a predetermined threshold value is smaller than the number of parts divided from a grayscale region in which the visual sensitivity is higher than the predetermined threshold value.

According to the above-mentioned aspect, it is possible to obtain the same effects as those of the fifth aspect.

Twentieth Aspect

According to a twentieth aspect of the invention, in the image processing apparatus according to the sixteenth aspect, preferably, the test pattern grayscale value selecting unit selects the test pattern grayscale values at equal intervals or at substantially equal intervals with respect to the visual sensitivity.

According to the above-mentioned aspect, it is possible to obtain the same effects as those of the sixth aspect.

Twenty-First Aspect

According to a twenty-first aspect of the invention, in the image processing apparatus according to the fourteenth aspect, preferably, the visual sensitivity is an L* value of a CIE 1976 L*a*b* color space.

According to the above-mentioned aspect, it is possible to obtain the same effects as those of the seventh aspect.

Twenty-Second Aspect

According to a twenty-second aspect of the invention, an image processing method includes: generating test pattern data considering visual characteristics, on the basis of a test pattern grayscale value determined on the basis of visual sensitivity; converting the test pattern data generated considering the visual characteristics into an N value (N≧2: N is a natural number); generating test pattern printing data on the basis of the N-value test pattern data obtained in the converting of the test pattern data; after printing is performed by a predetermined printing apparatus on the basis of the test pattern printing data generated in the generating of the printing data, detecting the output density of a test pattern printed by the predetermined printing apparatus; generating printer input/output density information for correcting input density, on the basis of the output density of the test pattern detected in the detecting of the output density; acquiring image data composed of M values (M>N≧2: M is a natural number); and correcting the input density of the image data acquired in the acquiring of the image data, on the basis of the printer input/output density information generated in the generating of the printer input/output density information.

According to the above-mentioned aspect, it is possible to obtain the same effects as those of the first aspect.

Twenty-Third Aspect

According to a twenty-third aspect of the invention, the image processing method according to the twenty-second aspect further includes selecting the test pattern grayscale value from a predetermined range of grayscale values on the basis of the visual sensitivity, and, in the generating of the test pattern data considering visual characteristics, the test pattern data is generated on the basis of the test pattern grayscale value selected in the selecting of the test pattern grayscale value.

According to the above-mentioned aspect, it is possible to obtain the same effects as those of the second aspect.

Twenty-Fourth Aspect

According to a twenty-fourth aspect of the invention, in the image processing method according to the twenty-third aspect, preferably, in the selecting of the test pattern grayscale value, the test pattern grayscale values are selected such that the number of test pattern grayscale values selected from a grayscale region in which the visual sensitivity is higher than a predetermined threshold value is larger than the number of test pattern grayscale values selected from a grayscale region in which the visual sensitivity is lower than the predetermined threshold value.

According to the above-mentioned aspect, it is possible to obtain the same effects as those of the third aspect.

Twenty-Fifth Aspect

According to a twenty-fifth aspect of the invention, in the image processing method according to the twenty-fourth aspect, preferably, in the selecting of the test pattern grayscale value, the test pattern grayscale values are selected such that the number of parts divided from a grayscale region in which the visual sensitivity is higher than a predetermined threshold value is larger than the number of parts divided from a grayscale region in which the visual sensitivity is lower than the predetermined threshold value.

According to the above-mentioned aspect, it is possible to obtain the same effects as those of the fourth aspect.

Twenty-Sixth Aspect

According to a twenty-sixth aspect of the invention, in the image processing method according to the twenty-fourth aspect, preferably, in the selecting of the test pattern grayscale value, the test pattern grayscale values are selected such that the number of parts divided from a grayscale region in which the visual sensitivity is lower than a predetermined threshold value is smaller than the number of parts divided from a grayscale region in which the visual sensitivity is higher than the predetermined threshold value.

According to the above-mentioned aspect, it is possible to obtain the same effects as those of the fifth aspect.

Twenty-Seventh Aspect

According to a twenty-seventh aspect of the invention, in the image processing method according to the twenty-third aspect, preferably, the selecting of the test pattern grayscale value selects the test pattern grayscale values at equal intervals or at substantially equal intervals with respect to the visual sensitivity.

According to the above-mentioned aspect, it is possible to obtain the same effects as those of the sixth aspect.

Twenty-Eighth Aspect

According to a twenty-eighth aspect of the invention, in the image processing method according to any one of the twenty-second to twenty-seventh aspects, preferably, the visual sensitivity is an L* value of a CIE 1976 L*a*b* color space.

According to the above-mentioned aspect, it is possible to obtain the same effects as those of the seventh aspect.

Twenty-Ninth Aspect

According to a twenty-ninth aspect of the invention, a printing program that allows a computer to execute: generating test pattern data considering visual characteristics, on the basis of a test pattern grayscale value determined on the basis of visual sensitivity; converting the test pattern data generated considering the visual characteristics into an N value (N≧2: N is a natural number); generating test pattern printing data on the basis of the N-value test pattern data obtained in the converting of the test pattern data; performing printing on the basis of the test pattern printing data generated in the generating of the printing data; detecting the output density of a test pattern printed in the performing of printing; generating printer input/output density information for correcting input density, on the basis of the output density of the test pattern detected in the detecting of the output density; acquiring image data composed of M values (M>N≧2: M is a natural number); and correcting the input density of the image data acquired in the acquiring of the image data, on the basis of the printer input/output density information generated in the generating of the printer input/output density information.

According to the above-mentioned aspect, it is possible to obtain the same effects as those of the first aspect.

Thirtieth Aspect

According to a thirtieth aspect of the invention, the printing program according to the twenty-ninth aspect further includes a program that allows the computer to execute selecting the test pattern grayscale value from a predetermined range of grayscale values on the basis of the visual sensitivity, and, in the generating of the test pattern data considering visual characteristics, the test pattern data is generated on the basis of the test pattern grayscale value selected in the selecting of the test pattern grayscale value.

According to the above-mentioned aspect, it is possible to obtain the same effects as those of the second aspect.

Thirty-First Aspect

According to a thirty-first aspect of the invention, in the printing program according to the thirtieth aspect, preferably, in the selecting of the test pattern grayscale value, the test pattern grayscale values are selected such that the number of test pattern grayscale values selected from a grayscale region in which the visual sensitivity is higher than a predetermined threshold value is larger than the number of test pattern grayscale values selected from a grayscale region in which the visual sensitivity is lower than the predetermined threshold value.

According to the above-mentioned aspect, it is possible to obtain the same effects as those of the third aspect.

Thirty-Second Aspect

According to a thirty-second aspect of the invention, in the printing program according to the thirty-first aspect, preferably, in the selecting of the test pattern grayscale value, the test pattern grayscale values are selected such that the number of parts divided from a grayscale region in which the visual sensitivity is higher than a predetermined threshold value is larger than the number of parts divided from a grayscale region in which the visual sensitivity is lower than the predetermined threshold value.

According to the above-mentioned aspect, it is possible to obtain the same effects as those of the fourth aspect.

Thirty-Third Aspect

According to a thirty-third aspect of the invention, in the printing program according to the thirty-first aspect, preferably, in the selecting of the test pattern grayscale value, the test pattern grayscale values are selected such that the number of parts divided from a grayscale region in which the visual sensitivity is lower than a predetermined threshold value is smaller than the number of parts divided from a grayscale region in which the visual sensitivity is higher than the predetermined threshold value.

According to the above-mentioned aspect, it is possible to obtain the same effects as those of the fifth aspect.

Thirty-Fourth Aspect

According to a thirty-fourth aspect of the invention, in the printing program according to the thirtieth aspect, preferably, the selecting of the test pattern grayscale value selects the test pattern grayscale values at equal intervals or at substantially equal intervals with respect to the visual sensitivity.

According to the above-mentioned aspect, it is possible to obtain the same effects as those of the sixth aspect.

Thirty-Fifth Aspect

According to a thirty-fifth aspect of the invention, in the printing program according to any one of the twenty-ninth to thirty-fourth aspects, preferably, the visual sensitivity is an L* value of a CIE 1976 L*a*b* color space.

According to the above-mentioned aspect, it is possible to obtain the same effects as those of the seventh aspect.

Thirty-Sixth Aspect

According to a thirty-sixth aspect of the invention, an image processing program that allows a computer to execute: generating test pattern data considering visual characteristics, on the basis of a test pattern grayscale value determined on the basis of visual sensitivity; converting the test pattern data generated considering the visual characteristics into an N value ($N \geq 2$: N is a natural number); generating test pattern printing data on the basis of the N-value test pattern data obtained in the converting of the test pattern data; after printing is performed by a predetermined printing apparatus on the basis of the test pattern printing data generated in the generating of the printing data, detecting the output density of a test pattern printed by the predetermined printing apparatus; generating printer input/output density information for correcting input density, on the basis of the output density of the test pattern detected in the detecting of the output density; acquiring image data composed of M values ($M > N \geq 2$: M is a natural number); and correcting the input density of the image data acquired in the acquiring of the image data, on the basis of the printer input/output density information generated in the generating of the printer input/output density information.

According to the above-mentioned aspect, it is possible to obtain the same effects as those of the first aspect.

Thirty-Seventh Aspect

According to a thirty-seventh aspect of the invention, the image processing program according to the thirty-sixth aspect further includes a program that allows the computer to execute selecting the test pattern grayscale value from a predetermined range of grayscale values on the basis of the visual sensitivity, and, in the generating of the test pattern data considering visual characteristics, the test pattern data is generated on the basis of the test pattern grayscale value selected in the selecting of the test pattern grayscale value.

According to the above-mentioned aspect, it is possible to obtain the same effects as those of the second aspect.

Thirty-Eighth Aspect

According to a thirty-eighth aspect of the invention, in the image processing program according to the thirty-seventh aspect, preferably, in the selecting of the test pattern grayscale value, the test pattern grayscale values are selected such that the number of test pattern grayscale values selected from a grayscale region in which the visual sensitivity is higher than a predetermined threshold value is larger than the number of test pattern grayscale values selected from a grayscale region in which the visual sensitivity is lower than the predetermined threshold value.

According to the above-mentioned aspect, it is possible to obtain the same effects as those of the third aspect.

Thirty-Ninth Aspect

According to a thirty-ninth aspect of the invention, in the image processing program according to the thirty-eighth aspect, preferably, in the selecting of the test pattern grayscale value, the test pattern grayscale values are selected such that the number of parts divided from a grayscale region in which the visual sensitivity is higher than a predetermined threshold value is larger than the number of parts divided from a grayscale region in which the visual sensitivity is lower than the predetermined threshold value.

According to the above-mentioned aspect, it is possible to obtain the same effects as those of the fourth aspect.

Fortieth Aspect

According to a fortieth aspect of the invention, in the image processing program according to the thirty-eighth aspect, preferably, in the selecting of the test pattern grayscale value, the test pattern grayscale values are selected such that the number of parts divided from a grayscale region in which the visual sensitivity is lower than a predetermined threshold value is smaller than the number of parts divided from a grayscale region in which the visual sensitivity is higher than the predetermined threshold value.

According to the above-mentioned aspect, it is possible to obtain the same effects as those of the fifth aspect.

Forty-First Aspect

According to a forty-first aspect of the invention, in the image processing program according to the thirty-seventh aspect, preferably, the selecting of the test pattern grayscale value selects the test pattern grayscale values at equal intervals or at substantially equal intervals with respect to the visual sensitivity.

According to the above-mentioned aspect, it is possible to obtain the same effects as those of the sixth aspect.

Forty-Second Aspect

According to a forty-second aspect of the invention, in the image processing program according to any one of the thirty-sixth to forty-first aspects, preferably, the visual sensitivity is an L* value of a CIE 1976 L*a*b* color space.

According to the above-mentioned aspect, it is possible to obtain the same effects as those of the seventh aspect.

Forty-Third Aspect

According to a forty-third aspect of the invention, a storage medium includes the printing program according to any one of the twenty-ninth to thirty-fifth aspects or the image processing program according to any one of the thirty-sixth to forty-second aspects stored therein.

According to the above-mentioned aspect, it is possible to obtain the same effects as those of any one of the first to seventh aspects.

BRIEF DESCRIPTION OF THE DRAWINGS

The invention will be described with reference to the accompanying drawings, wherein like numbers reference like elements.

FIG. 7 is a table showing test pattern grayscale values considering visual characteristics (for 8 grayscale levels).

FIG. 8 is a table showing test pattern grayscale values considering visual characteristics (for 16 grayscale levels).

DESCRIPTION OF EXEMPLARY EMBODIMENTS

Hereinafter, a printing apparatus according to an embodiment of the invention will be described with reference to the accompanying drawings.

Figure 1:
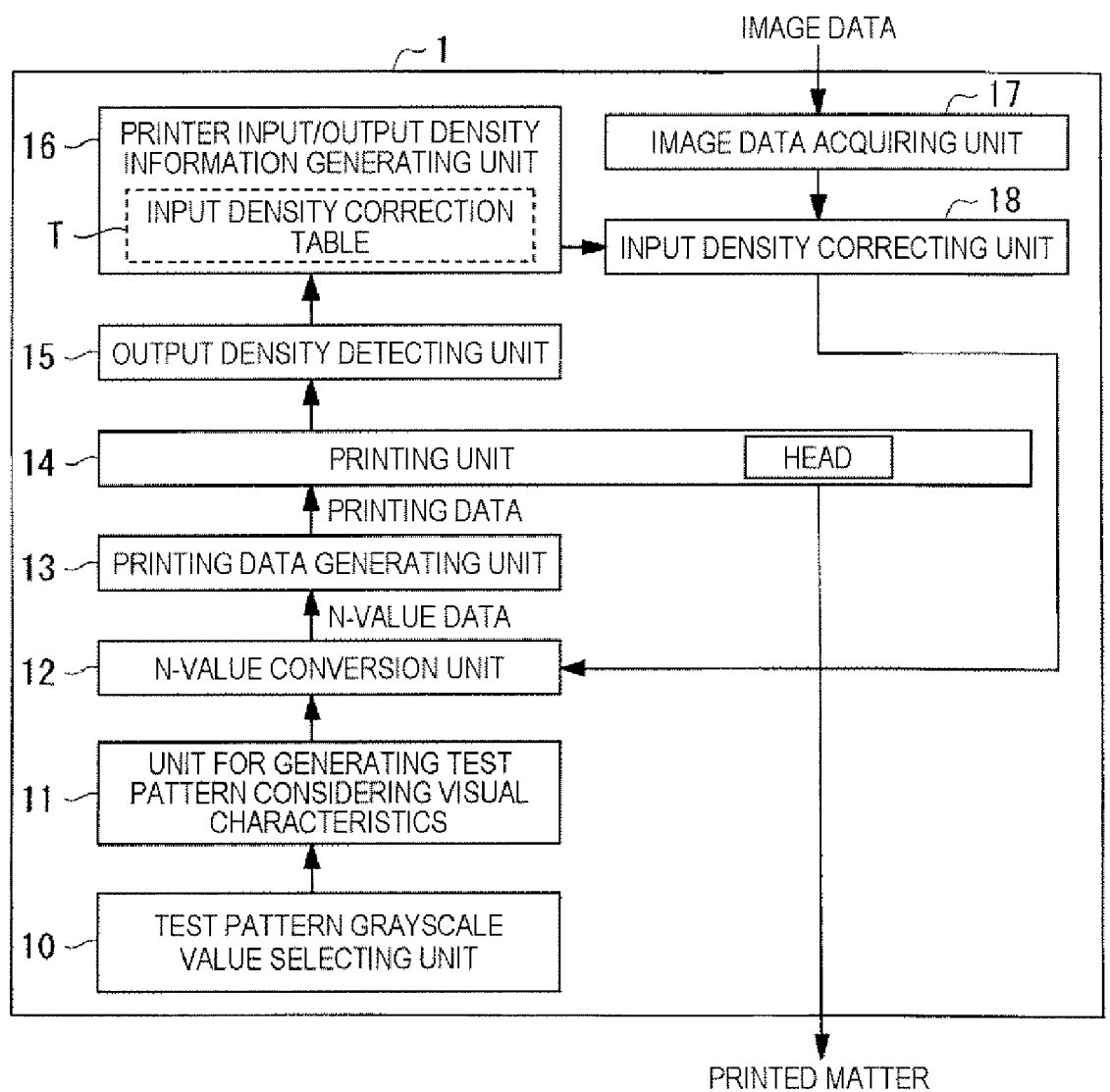
FIG. 1 is a block diagram illustrating the structure of a printing apparatus according to an embodiment of the invention.

FIG. 1 is a block diagram illustrating the structure of the printing apparatus according to the embodiment of the invention.

The printing apparatus includes a test pattern grayscale value selecting unit 10, a unit 11 for generating a test pattern considering visual characteristics, an N-value conversion unit 12, a printing data generating unit 13, a printing unit 14, an output density detecting unit 15, a printer input/output density information generating unit 16, an image data acquiring unit 17, and an input density correcting unit 18. The printer input/output density information generating unit 16 has an input density correction table T stored therein.

The test pattern grayscale value selecting unit 10 selects a test pattern grayscale value considering visual characteristics on the basis of visual sensitivity.

The unit 11 for generating a test pattern considering visual characteristics generates test pattern data on the basis of the test pattern grayscale value selected by the test pattern grayscale value selecting unit 10.

The N-value conversion unit 12 converts the test pattern data generated by the unit 11 for generating a test pattern considering visual characteristics into an N value (N is equal to or larger than 2, where N is a natural number).

The printing data generating unit 13 generates test pattern printing data on the basis of the N-value test pattern data output from the N-value conversion unit 12.

The printing unit 14 performs printing on the basis of the test pattern printing data generated by the printing data generating unit 13.

The output density detecting unit 15 reads and detects the output density of the printed data. For example, a scanner is used as the output density detecting unit 15.

The printer input/output density information generating unit 16 generates an input density correction table T on the basis of output density data read by the output density detecting unit 15. The input density correction table T indicates the relationship between output density and input density, and the input density is corrected on the basis of the input density correction table T.

The image data acquiring unit 17 acquires image data composed of M values (M>N≧2; N is a natural number).

The input density correcting unit 18 corrects the input density of the image data acquired by the image data acquiring unit 17 on the basis of printer input/output density information of the input density correction table that is generated by the printer input/output density information generating unit 16.

The N-value conversion unit 12 converts the image data whose input density has been corrected by the input density correcting unit 18 into an N value, and the printing data generating unit 13 converts the N-value image data into printing image data. Then, the printing unit 14 performs printing on the basis of the printing image data.

In this embodiment, one N-value conversion unit 12 is used two times to generate N-value test pattern data and N-value image data However, two different N-value conversion units may be used as long as they can have an N-value conversion function. That is, a first N-value conversion unit may be used to convert test pattern data into an N value, and a second N-value conversion unit may be used to convert actual image data into an N value.

In the above-described embodiment, the printer input/output density information generating unit 16 has an input density correction table (for example, LUT for determining the correspondence between input values and output values), that is, the input density correction table T stored therein (structure 1). Alternatively, the printer input/output density information generating unit 16 may have a printer input/output density table (a table simply indicating the relationship between the input and the output of a printer) stored therein (structure 2).

In the structure 1, the printer input/output density information generating unit 16 generates an 'input density correction table' having input density correction values recorded thereon, and the input density correcting unit 18 converts input/output density on the basis of LUT. According to this structure, since the table has a large size, the capacity of the memory is reduced. However, because one-to-one conversion that simply refers values is performed, it is possible to increase a processing speed.

In contrast, in the structure 2, the printer input/output density information generating unit 16 generates a 'printer input/output density table' having the relationship between the input and the output of a printer recorded thereon, and the input density correcting unit 18 complementarily calculates the relationship between input density and output density to correct the input density with reference to the table. According to this structure, it takes a lot of time to perform the complementary calculation, but the table has a small size and thus occupies a small space of the memory.

Figure 2:
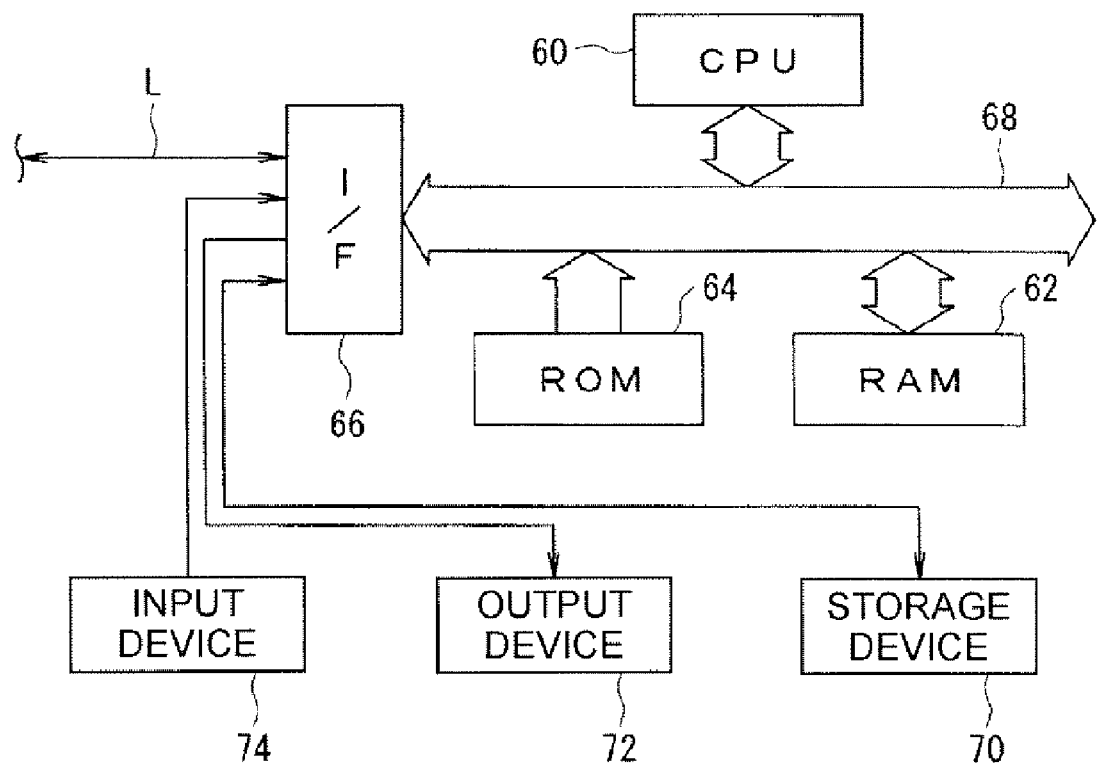
FIG. 2 is a block diagram illustrating the hardware structure of a computer system.

The printing apparatus 1 includes a computer system for performing various printing control processes and realizing on software the functions of the test pattern grayscale value selecting unit 10, the unit 11 for generating a test pattern considering visual characteristics, the N-value conversion unit 12, the printing data generating unit 13, and the printing unit 14, the output density detecting unit 15, the printer input/output density information generating unit 16, the image data acquiring unit 17, and the input density correcting unit 18. As shown in FIG. 2, the hardware configuration of the computer system has a CPU (central processing unit) 60 which is a central processor that performs various control and computing processes, a RAM (random access memory) 62 which forms a main storage unit, a ROM (read only memory) 64, various internal and external buses 68 formed of a PCI (peripheral component interconnect) bus, an ISA (industrial standard architecture) bus, etc., which connect the above-mentioned components, an external storage unit (secondary storage unit) 70, such as an HDD, an output device 72, such as the printing unit 14, a CRT, or an LCD monitor, an input device 74, such as an operation panel, a mouse, a keyboard, or a scanner, and a network L for communicating with a printing instruction unit (not shown). The storage unit 70, the output device 72, the input device 74, and the network are connected to the buses 68 through an input/output interface (I/F) 66.

When power is turned on, a system program, such as BIOS stored in the ROM 64 loads to the RAM 62 various dedicated computer programs stored in the ROM 64 beforehand or various dedicated computer programs installed in the storage unit 70 through a storage medium, such as CD-ROM, DVD-ROM, or a flexible disk (FD), or through a communication network L such as the Internet. In accordance with instructions described in the programs loaded to the RAM 62, the CPU 60 uses various resources to perform predetermined control and computing processes to implement the functions of the above-described components on software.

Furthermore, in the program, most printing apparatuses on the market, such as ink-jet printers, include computer systems each having a central processing unit (CPU), storage devices (RAM and ROM), and an input/output device, and use software to allow the computer system to execute the functions of the above-mentioned components, which makes it possible to economically and easily realize the functions of the above-mentioned components rather than a structure in which dedicated software is used to realize the functions of the above-mentioned components. In addition, it is possible to easily update the program for functional modification, improvement and the like by rewriting a portion of the program.

Next, an input density correction table making method and an input density correcting/printing method according to an embodiment of the invention will be described below with reference to FIGS. 3 and 4.

Figure 3:
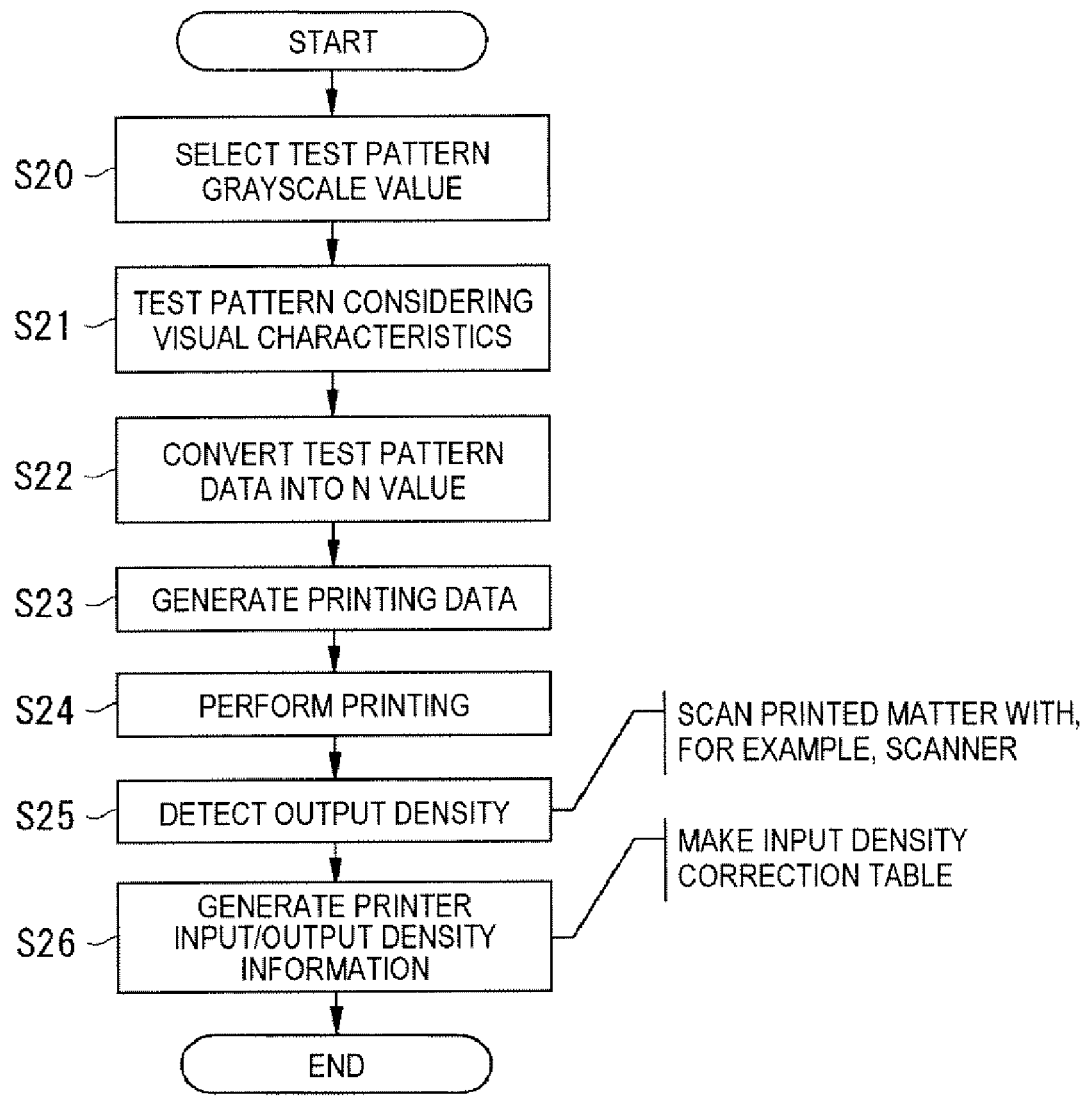
FIG. 3 is a flow chart illustrating a process of making an input density correction table of the printing apparatus according to the embodiment of the invention.

FIG. 3 is a flow chart illustrating an input density correction table making process according to the embodiment of the invention.

In order to make the input density correction table T, in step S20, the test pattern grayscale value selecting unit 10 selects a test pattern grayscale value considering visual characteristics.

Then, in step S21, the unit 11 generates input density correcting test pattern data considering visual characteristics on the basis of the selected test pattern grayscale value.

In step S22, the N-value conversion unit 12 converts the test pattern data considering visual characteristics that is generated by the unit 11 into an N value.

In step S23, the printing data generating unit 13 generates test pattern printing data on the basis of the N-value test pattern data considering visual characteristics that is output from the N-value conversion unit 12.

Then, in step S24, the printing unit 14 performs printing on the basis of the test pattern printing data generated by the printing data generating unit 13.

In step S25, the output density detecting unit 15 reads a printed matter that is printed by the printing unit 14 on the basis of the test pattern printing data considering visual characteristics, and the output density of the printed matter is detected by, for example, a scanner.

Subsequently, in step S26, the printer input/output density information generating unit 17 generates printer input/output density information indicating the correspondence between the output density and the input density of a printer, on the basis of the output density detected by the output density detecting unit 15, and holds the information as the input density correction table T.

Figure 4:
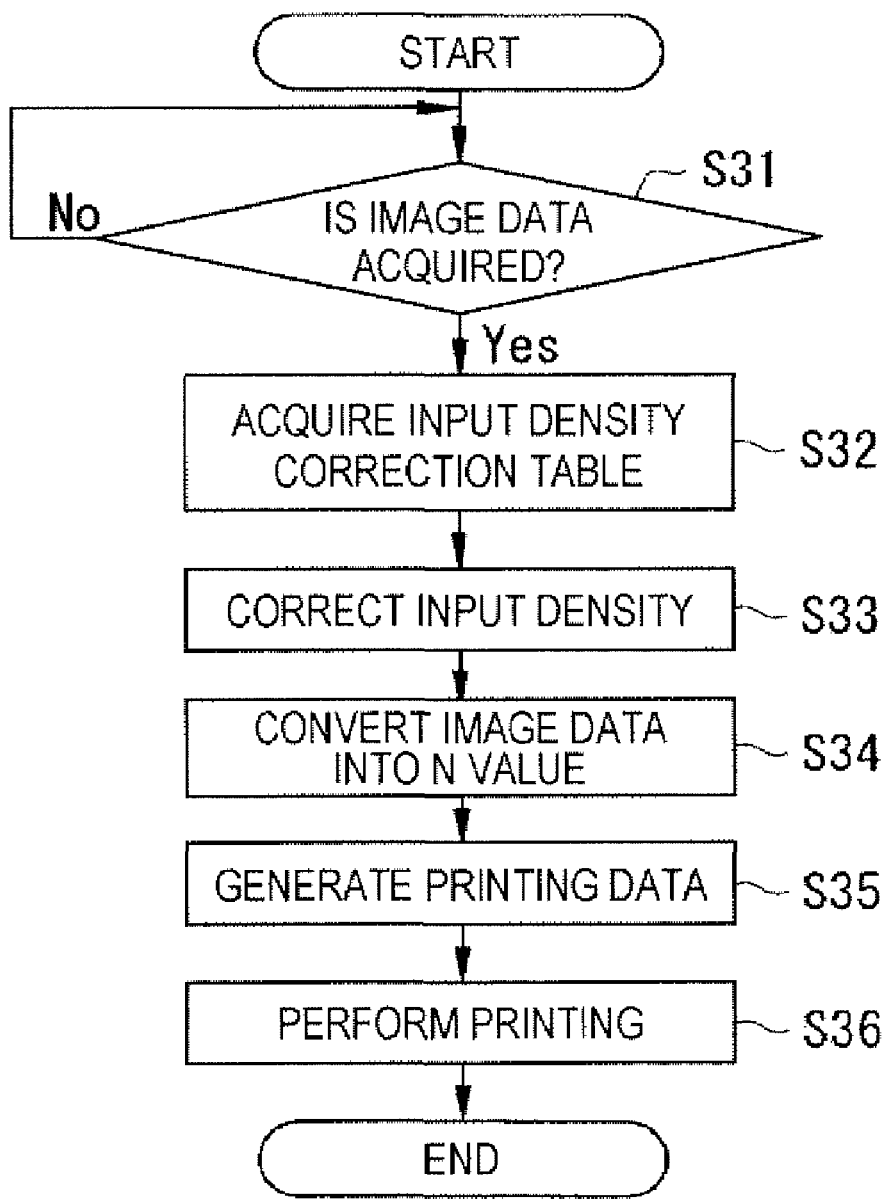
FIG. 4 is a flow chart illustrating an input density correcting/printing process by the printing apparatus according to the embodiment of the invention.

FIG. 4 is a flow chart illustrating the input density correcting/printing process according to the embodiment of the invention.

In order to correct input density, in step S31, it is determined whether the image data acquiring unit 17 acquires image data from the outside. As a result, when it is determined that the image data acquiring unit 17 acquires image data from the outside, the process proceeds to step S32. On the other hand, when it is determined that the image data acquiring unit 17 acquires no image data from the outside, it is determined whether the image data acquiring unit 17 acquires image data from the outside again.

Subsequently, in step S32, the input density correcting unit 18 receives the image data from the image data acquiring unit 17 and then acquires the input density correction table T stored in the printer input/output density information generating unit 16.

Then, in step S33, the input density correcting unit 18 corrects the input density of the image data acquired by the image data acquiring unit 17, on the basis of the input density correction table T acquired by the printer input/output density information generating unit 16.

Successively, in step S34, the N-value conversion unit 12 converts the image data whose input density has been corrected by the input density correcting unit 18 into an N value.

Then, in step S35, the printing data generating unit 13 generates printing image data on the basis of the N-value image data obtained by the N-value conversion unit 12

In step S36, the printing unit 14 performs printing on the basis of the printing image data transmitted from the printing data generating unit 13.

Figure 5:
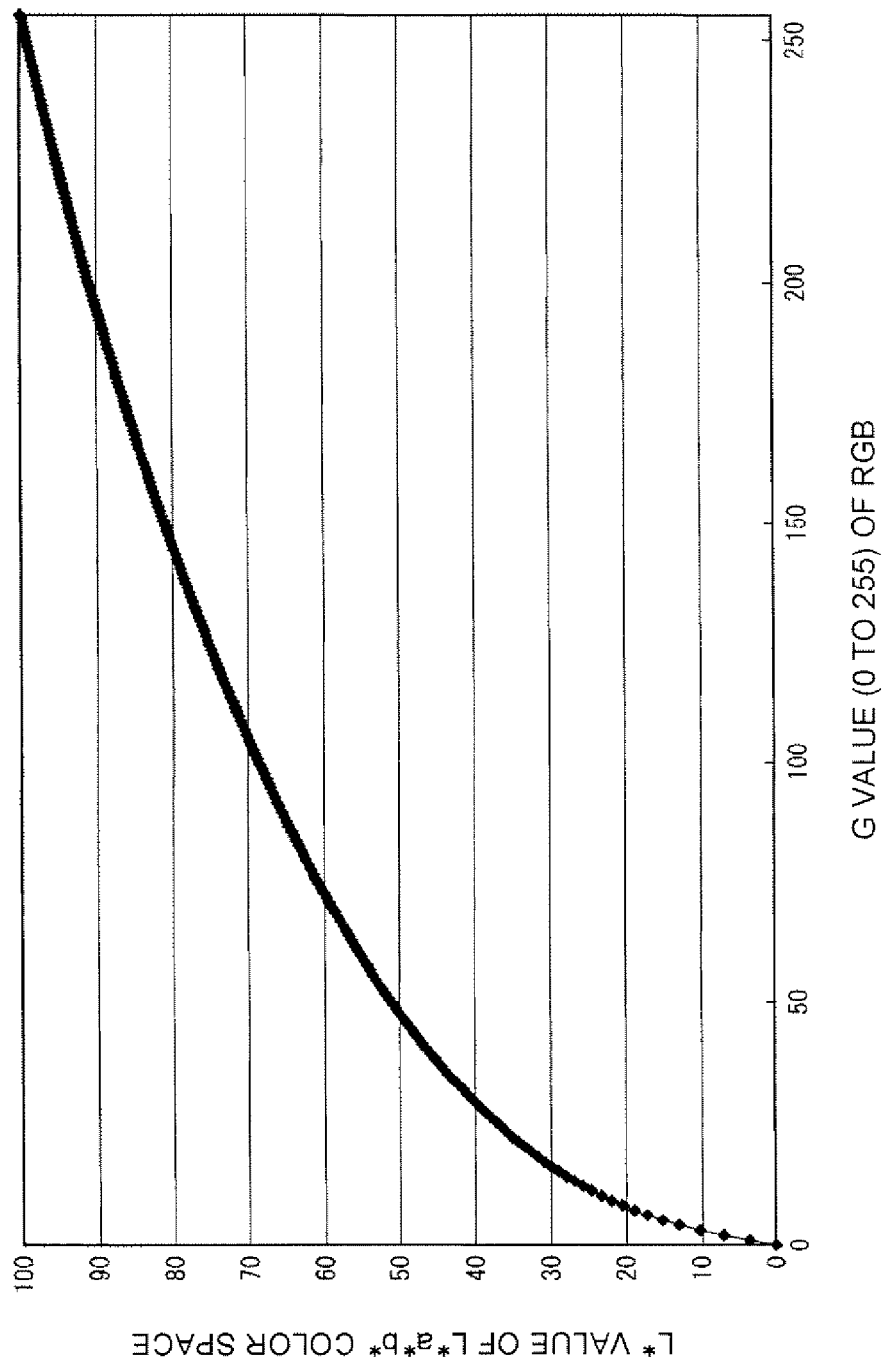
FIG. 5 is a graph illustrating the relationship between grayscale levels and brightness.

FIG. 5 is a graph illustrating the relationship between an RGB-G value and a brightness value L*a*b*-L*. A method of generating test pattern data considering visual characteristics will be described with reference to the graph.

In this embodiment, a graph in which the horizontal axis represents the RGB-G value and the vertical axis represents the brightness value L*a*b*-L* is used to select a test pattern grayscale value. The reason why the RGB-G value is represented along the horizontal axis is because the parameter of a G value among RGB values has the greatest effect on a brightness value L*. As can be seen from the following description, the G value has the greatest effect on the calculation of XYZ values from RGB values described later. The brightness value L*a*b*-L* indicates a brightness value L* of an L*a*b* color system, and is in the range of 0 to 100. As the brightness value approaches zero, the color becomes dark, and as the brightness value approaches 100, the color becomes bright. The RGB-G value indicates the output brightness G (green) of green in an RGB (red, green, and blue) color model, and is in the range of 0 to 255. FIG. 5 shows a convex graph in which the brightness value increases sharply and is then stabilized. The substantially linear relationship is established between the brightness value L* and the visual characteristics (the amount of sensibility) of the human eye. For example, the sensibility of the human eye when the brightness value L* is changed from 10 to 20 is substantially equal to the sensibility of the human eye when the brightness value L* is changed from 30 to 40. Therefore, when the graph curves sharply upward, a method of equally dividing the brightness value L*a*b*-L* to form a test pattern rather than a method of equally dividing the RGB-G value to form a test pattern can form a test pattern, which is a standard for measuring the sensibility of the human eye, and appropriately perform correction.

It is preferable that the visual sensitivity be the value L* in a CIE 1976 L*a*b* color space as the standard for the brightness. The CIE 1976 L*a*b* color space is an L*a*b* color system that has come into widespread use in the Japanese industrial field to measure color difference in color management, and is a mixed color system in which the value L* indicates the brightness, the value a* indicates a red-green axis, and the value b* indicates a yellow-blue axis. The difference between two colors is calculated by extracting the square root of the sum of the square of the difference between the values L* and a* and the square of the difference between the values L* and b*. The color difference values relatively common to the sensibility of the human eye are represented at all coordinates of the color space at the time of color management. The color system is applied to printing or the color management of color printing.

In order to make the graph composed of the brightness value L*a*b*-L* and the RGB-G value shown in FIG. 5, first, the brightness value L*a*b*-L* is converted into an XYZ-Y value, and the XYZ-Y value and the RGB-G value are represented by a linear function (linear relationship). Then, the RGB-G value is calculated from the XYZ-Y value using the graph shown in FIG. 6.

Figure 6:
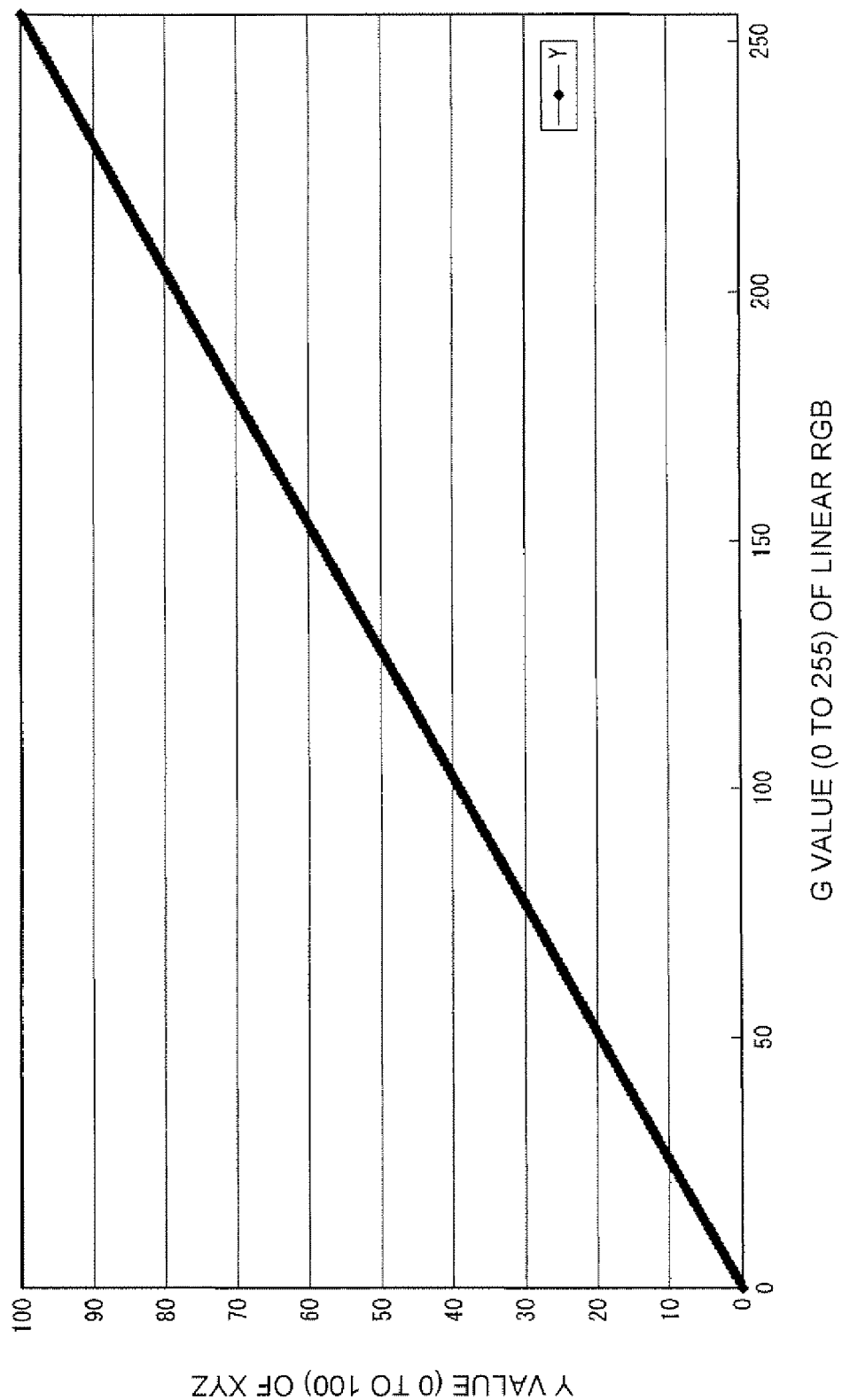
FIG. 6 is a graph illustrating a linear function of an XYZ-Y value and an RGB-G value.

FIG. 6 is a graph illustrating the linear relationship between the XYZ-Y value and the RGB-G value. A method of calculating the RGB-G value on the basis of the brightness value L*a*b*-L* will be described with reference to the graph shown in FIG. 6.

Before XYZ values are converted into RGB values, the XYZ values are converted into linear RGB values. In the case of the color of an object, the XYZ values are divided into 100 values beforehand to normalize the values. That is, the following expression is obtained:

$R=3.5064X-1.7400Y-0.5441Z,$ $G=-1.0690X+1.9777Y+0.0352Z,$ and $B=0.0563X-0.1970Y+1.0511Z.$ Then, the calculated RGB values are multiplied by 255 to return to the range of 0 to 255.

Next, a method of converting the brightness value L*a*b*-L* into the XYZ-Y value will be described below.

First, the following relationship is established between XYZ and L*a*b*.

When Yn=100 and (Y/Yn)>0.08856, $L*=116(Y/Yn)1/3-16.$

When (Y/Yn)<0.08856, $L*=7.7787(Y/Yn)+16/116-16.$

Therefore, the calculation can be reversed to convert the brightness value L*a*b* into the XYZ value.

In this way, it is possible to calculate the RGB-G value on the basis of the brightness value L*a*b*-L*.

Next, FIG. 7 is a table having the L* values obtained by dividing the vertical axis of FIG. 5, that is, the brightness value L*a*b*-L* into eight equal parts and the RGB-G values on the horizontal axis that correspond to the divided L* values. FIG. 8 is a table having the L* values obtained by dividing the vertical axis of FIG. 5, that is, the brightness value L*a*b*-L* into sixteen equal parts and the RGB-G values on the horizontal axis that correspond to the divided L* values. FIG. 7 shows the relationship between RGB-G values for eight grayscale levels and the brightness values L*a*b*-L* because the brightness value L*a*b*-L* is divided into eight equal parts by 7 equal division numbers. FIG. 8 shows the relationship between RGB-G values for sixteen grayscale levels and the brightness values L*a*b*-L* because the brightness value L*a*b*-L* is divided into sixteen equal parts by 15 equal division numbers.

As shown in FIG. 7, when the maximum value, 100.0, of the brightness value L*a*b*-L* is divided into eight equal parts and numbers 0 to 7 are given to the divided values, number 0 has an L* value of 0.0, number 1 has an L* value of 14.3, number 2 has an L* value of 28.6, . . . , number 7 has an L* value of 100.0. That is, the L* values increase from 0.0 to 100.0 at equal intervals of about 14.3. When the RGB-G values are calculated from the L* values on the basis of the graph of FIG. 5 that shows the correspondence between the L* values and the RGB-G values, the RGB-G values corresponding to the L* values are 0, 5, 14, 33, 64, . . . , 255, which shows that the RGB-G value increases at a rate higher than that at which the L* value increases.

Similarly, as shown in FIG. 8, when the maximum value, 100.0, of the brightness value L*a*b*-L* is divided into sixteen equal parts and numbers 0 to 15 are given to the divided values, number 0 has an L* value of 0.0, number 1 has an L* value of 6.7, number 2 has an L* value of 13.3, . . . . That is, the L* values increase from 0.0 to 100.0 at equal intervals of about 6.7. When the RGB-G values are calculated from the L* values on the basis of the graph of FIG. 5 that shows the correspondence between the L* values and the RGB-G values, the RGB-G values corresponding to the L* values are 0, 3, 4, 8, 13, 20, . . . , which shows that the RGB-G value increases at a rate higher than that at which the L* value increases.

Next, a method of determining input brightness used for the test pattern using the RGB-G values shown in FIG. 7 or 8 as output brightness of a printer input/output characteristic curve, which will be described later, is described below.

In order to determine a test pattern input grayscale, the RGB-G values shown in FIG. 7 or 8 are used as the output brightness of input/output characteristics to determine an input grayscale value used for the test pattern.

Figures 9, 10:
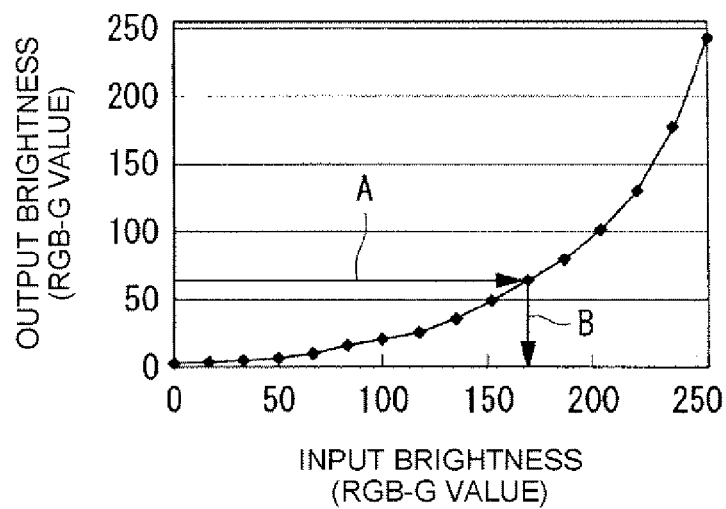
FIG. 9 is a graph illustrating a printer input/output characteristic.
FIG. 10 is a table for conversion between output brightness RGB-G values and input brightness RGB-G values (for 8 grayscale levels).

FIG. 9 is a graph illustrating the relationship between an input brightness RGB-G value and an output brightness RGB-G value.

According to the graph shown in FIG. 9, it is possible to calculate the input brightness RGB-G values on the basis of the output brightness RGB-G values obtained from FIGS. 7 and 8. The output brightness means a brightness value obtained by scanning the printed matter by the printer with a scanner (a brightness value in which γ characteristics of the scanner have also been corrected). A line represented by arrow A shows that the output brightness RGB-G value of FIG. 7 is 64. The input brightness RGB-G value corresponding to the output brightness RGB-G value is represented by arrow B. In this case, the input brightness RGB-G value is 168. In this way, the input brightness RGB-G values are calculated from the output brightness RGB-G values, which are shown in FIGS. 10 and 11.

FIG. 10 a table showing the output brightness RGB-G values obtained by dividing the vertical axis of FIG. 9, that is, the output brightness RGB-G value, into eight equal parts and the input brightness RGB-G values on the horizontal axis that correspond to the divided output brightness RGB-G values. FIG. 11 a table showing the output brightness RGB-G values obtained by dividing the vertical axis of FIG. 9, that is, the output brightness RGB-G value, into sixteen equal parts and the input brightness RGB-G values on the horizontal axis that correspond to the divided output brightness RGB-G values. FIG. 10 shows the relationship between the output brightness RGB-G values for eight grayscale levels and the input brightness RGB-G values because the output brightness RGB-G value is divided into eight equal parts by 7 equal division numbers. FIG. 11 shows the relationship between the output brightness RGB-G values for sixteen grayscale levels and the input brightness RGB-G values because the output brightness RGB-G value is divided into sixteen equal parts by 15 equal division numbers.

In the conversion (for 8 grayscale levels) between the output brightness RGB-G value and the input brightness RGB-G value of FIG. 10, when the output brightness RGB-G value is changed like the output brightness RGB-G value obtained from FIG. 7, that is, the output brightness RGB-C value is changed to 0, 5, 14, 33, 64, . . . , 255, input brightness RGB-G values of 0, 32, 82, 127, 168, . . . , 255 are calculated on the basis of the graph shown in FIG. 9, as shown in FIG. 10.

Figures 11, 12:
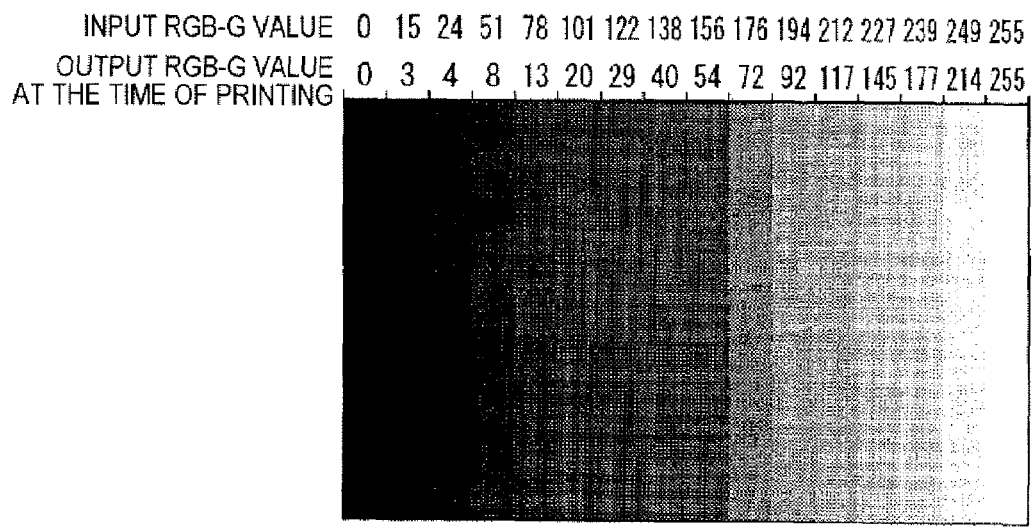
FIG. 11 is a table for conversion between output brightness RGB-G values and input brightness RGB-G values (for 16 grayscale levels).
FIG. 12 is a diagram illustrating an example of a test pattern based on data shown in FIG. 11.
Figure 13:
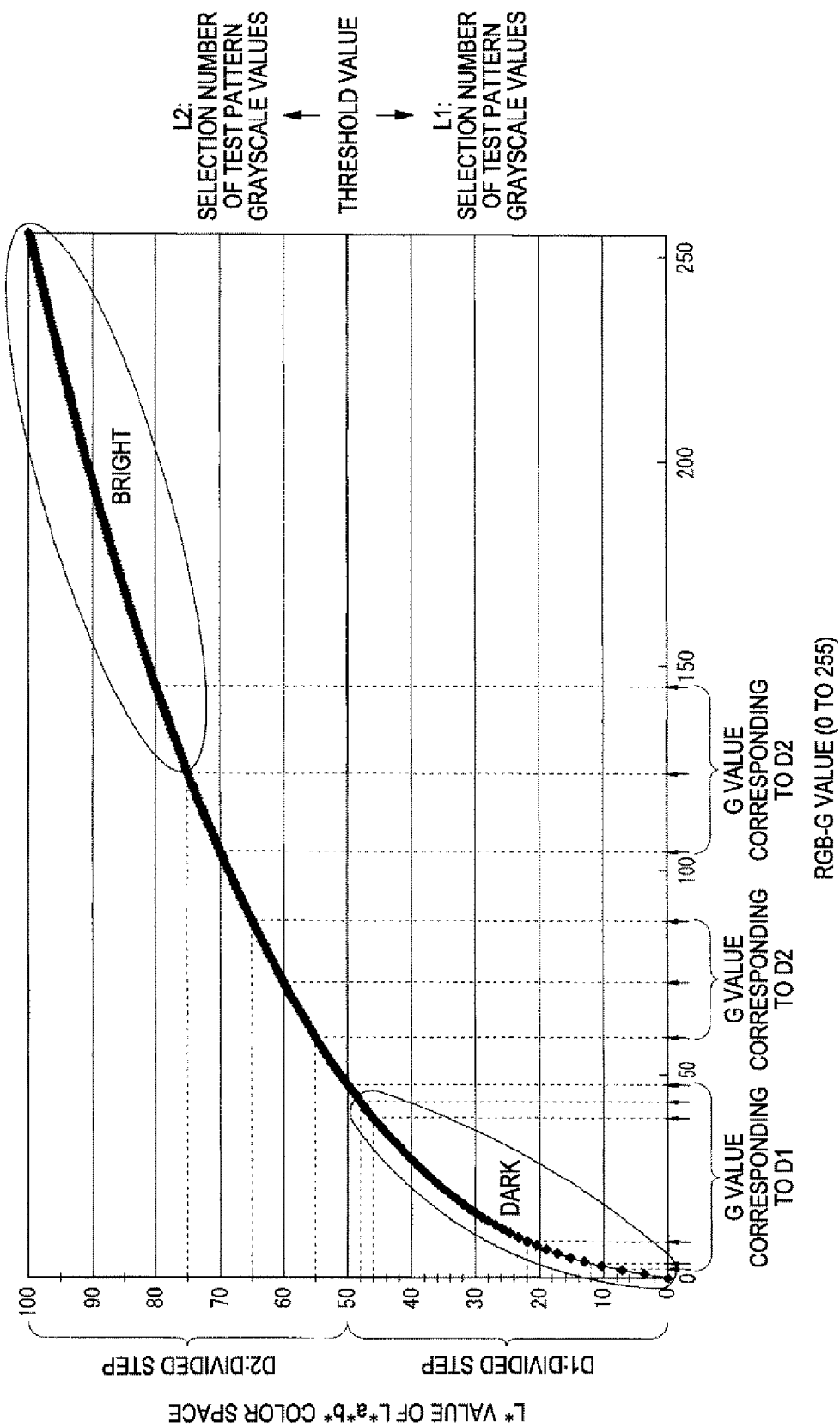
FIG. 13 is a diagram illustrating a method of determining a selection number of a test pattern grayscale value.

Similarly, in the conversion (for 16 grayscale levels) between the output brightness RGB-G value and the input brightness RGB-G value of FIG. 11, when the output brightness RGB-G value is changed like the output brightness RGB-G value obtained from FIG. 8, that is, the output brightness RGB-G value is changed to 0, 3, 4, 8, 13, . . . , 255, input brightness RGB-C values of 0, 15, 24, 51, 78, . . . , 255 are calculated on the basis of the graph shown in FIG. 9, as shown in FIG. 11.

A test pattern shown in FIG. 12 is formed on the basis of the input brightness RGB-G value conversion and the output brightness RGB-G values calculated in this way.

FIG. 12 is a diagram illustrating the test pattern formed on the basis of the output brightness RGB-G values at the time of printing.

FIG. 12 shows the test pattern using 16 grayscale levels determined on the basis of the values shown in FIG. 11. In FIG. 12, among the numbers written at the upper side of the test pattern, the numbers in the upper row indicate the input brightness RGB-G values, and the numbers in the lower row indicate the output brightness RGB-G values. The test pattern is a density correcting test pattern TP that selects grayscale values considering visual characteristics. The test pattern TP enables a method of correcting the density of each line corresponding to a reduced grayscale level to be performed on the image data acquired by the image data acquiring unit 17, which makes it possible to reduce banding visually noticeable to the human eye.

In the above-described embodiment, when the processes shown in the flow charts of FIGS. 3 and 4 are performed, the control programs previously stored in the ROM are executed, but the invention is not limited thereto. For example, the programs may be read from a storage medium having the programs stored therein to the RAM, and then executed. Alternatively, the programs may be acquired over a network.

As the storage medium, any of the following storage media can be used: a semiconductor storage medium, such as RAM or ROM; a magnetic storage medium, such as FD or HD; an optical reading storage medium, such as CD, CDV, LD, or DVD; a magnetic/optical reading storage medium, such as MO. Any storage media can be used as long as they can be read by a computer regardless of the data reading methods, such as electric, magnetic, and optical reading methods.

Although the embodiment of the invention has been described above, the invention is not limited thereto. Various modifications and changes of the invention can be made without departing from the spirit and scope of the invention. For example, in the above-described embodiment, two types of tables, that is, a table for 8 grayscale levels and a table for 16 grayscale levels, are used, but the invention is not limited thereto. Tables for grayscale levels other than 8 grayscale levels and 16 grayscale levels may be used.

In the above-described embodiment, the brightness is used as the factor sensitive to visual characteristics, but the invention is not limited thereto. For example, various factors, such as tone and color, may be set to visual characteristics, or a combination of the factors may be set to visual characteristics.

In the above-described embodiment, the image data acquiring unit 17 is provided to acquire image data from the outside, but the invention is not limited thereto. An image data storage unit may be provided in the image data acquiring unit, image data may be stored in the image data storage unit beforehand, and the image data may be acquired from the image data storage unit, if necessary.

In the above-described embodiment, the test pattern data is generated whenever printing is performed, but the invention is not limited thereto. For example, once test pattern data is generated, the test pattern data may be stored in a predetermined storage unit, and when the same image is used or the same printing is performed, the test pattern data may be read from the storage unit, if necessary.

In the above-described embodiment, an ink-jet printing apparatus provided with a head is used as the printing unit, but the invention is not limited thereto. Various printing units may be used.

In the above-described embodiment, the scanner is used as a unit for detecting the output density of a test pattern, but the invention is not limited thereto. For example, various units, such as sensors capable of visually detecting output density, may be used as the unit for detecting output density of a test pattern.

In the above-described embodiment, the N-value conversion unit 12, the printing data generating unit 13, and the printing unit 14 are used two times for the test pattern and the image data, but the invention is not limited thereto. For example, two sets of the N-value conversion unit 12, the printing data generating unit 13, and the printing unit 14 may be provided in the printing apparatus so as to be used for the test pattern and the image data. At least one of the N-value conversion unit 12, the printing data generating unit 13, and the printing unit 14 which are used for the image data may be provided in another printing apparatus.

This application claims priority to Japanese Patent Application Nos. 2005-315763, filed Oct. 31, 2005, and 2006-206475, filed Jul. 28, 2006 which are hereby expressly incorporated by reference herein in their entirety.

What is claimed is:

1. A printing apparatus comprising:
a unit that generates test pattern data considering visual characteristics, on the basis of a test pattern grayscale value determined on the basis of visual sensitivity;
an N-value conversion unit that converts the test pattern data generated by the unit that generates test pattern data considering visual characteristics into an N value (N≧2: N is a natural number);
a printing data generating unit that generates test pattern printing data on the basis of the N-value test pattern data output from the N-value conversion unit;
a printing unit that performs printing on the basis of the test pattern printing data generated by the printing data generating unit;
an output density detecting unit that detects the output density of a test pattern printed by the printing unit;
a printer input/output density information generating unit that generates printer input/output density information for correcting input density, on the basis of the output density of the test pattern detected by the output density detecting unit;
an image data acquiring unit that acquires image data composed of M values (M>N≧2: M is a natural number);
an input density correcting unit that corrects the input density of the image data acquired by the image data acquiring unit, on the basis of the printer input/output density information generated by the printer input/output density information generating unit; and
a test pattern grayscale value selecting unit that selects the test pattern grayscale value from a predetermined range of grayscale values on the basis of the visual sensitivity;
wherein the unit that generates test pattern data considering visual characteristics generates the test pattern data on the basis of the test pattern grayscale value selected by the test pattern grayscale value selecting unit.

2. The printing apparatus according to claim 1,
wherein the test pattern grayscale value selecting unit selects the test pattern grayscale values such that the number of test pattern grayscale values selected from a grayscale region in which the visual sensitivity is higher than a predetermined threshold value is larger than the number of test pattern grayscale values selected from a grayscale region in which the visual sensitivity is lower than the predetermined threshold value.

3. The printing apparatus according to claim 1,
wherein the test pattern grayscale value selecting unit selects the test pattern grayscale values such that the number of parts divided from a grayscale region in which the visual sensitivity is higher than a predetermined threshold value is larger than the number of parts divided from a grayscale region in which the visual sensitivity is lower than the predetermined threshold value.

4. The printing apparatus according to claim 1,
wherein the test pattern grayscale value selecting unit selects the test pattern grayscale values such that the number of parts divided from a grayscale region in which the visual sensitivity is lower than a predetermined threshold value is smaller than the number of parts divided from a grayscale region in which the visual sensitivity is higher than the predetermined threshold value.

5. The printing apparatus according to claim 1,
wherein the test pattern grayscale value selecting unit selects the test pattern grayscale values at equal intervals or at substantially equal intervals with respect to the visual sensitivity.

6. The printing apparatus according to claim 1,
wherein the visual sensitivity is an L* value of a CIE 1976 L*a*b* color space.

7. An image processing apparatus comprising:
a unit that generates test pattern data considering visual characteristics, on the basis of a test pattern grayscale value determined on the basis of visual sensitivity;
an N-value conversion unit that converts the test pattern data generated by the unit that generates test pattern data considering visual characteristics into an N value (N≧2: N is a natural number);
a printing data generating unit that generates test pattern printing data on the basis of the N-value test pattern data output from the N-value conversion unit;
an output density detecting unit that, after printing is performed by a predetermined printing apparatus on the basis of the test pattern printing data generated by the printing data generating unit, detects the output density of a test pattern printed by the predetermined printing apparatus;
a printer input/output density information generating unit that generates printer input/output density information for correcting input density, on the basis of the output density of the test pattern detected by the output density detecting unit;
an image data acquiring unit that acquires image data composed of M values (M>N≧2: M is a natural number);
an input density correcting unit that corrects the input density of the image data acquired by the image data acquiring unit, on the basis of the printer input/output density information generated by the printer input/output density information generating unit; and
a test pattern grayscale value selecting unit that selects the test pattern grayscale value from a predetermined range of grayscale values on the basis of the visual sensitivity;
wherein the unit that generates test pattern data considering visual characteristics generates the test pattern data on the basis of the test pattern grayscale value selected by the test pattern grayscale value selecting unit.

8. A printing program stored in a computer-readable storage medium that allows a computer to execute:
selecting a test pattern grayscale vale from a predetermined range of grayscale values on the basis of visual sensitivity;

generating test pattern data considering visual characteristics, on the basis of the test pattern grayscale value selected on the basis of the visual sensitivity;

converting the test pattern data generated considering the visual characteristics into an N value (N≧2: N is a natural number);

generating test pattern printing data on the basis of the N-value test pattern data obtained in the converting of the test pattern data;

performing printing on the basis of the test pattern printing data generated in the generating of the printing data;

detecting the output density of a test pattern printed in the performing of printing;

generating printer input/output density information for correcting input density, on the basis of the output density of the test pattern detected in the detecting of the output density;

acquiring image data composed of M values (M>N≧2: M is a natural number); and correcting the input density of the image data acquired in the acquiring of the image data, on the basis of the printer input/output density information generated in the generating of the printer input/output density information.

* * * * *